US012793300B2

(12) United States Patent
Song

(10) Patent No.: US 12,793,300 B2
(45) Date of Patent: Nov. 10, 2026

(54) ELECTRONIC DEVICE OR METHOD OF THE SAME FOR PROVIDING EMOTICON GENERATING

(71) Applicant: CODEVISION INC., Seoul (KR)

(72) Inventor: Eung Yeol Song, Seoul (KR)

(73) Assignee: CODEVISION INC., Seoul (KR)

( * ) Notice: Subject to any disclaimer, the term of this patent is extended or adjusted under 35 U.S.C. 154(b) by 0 days.

(21) Appl. No.: 19/031,467

(22) Filed: Jan. 18, 2025

(65) Prior Publication Data

US 2025/0280183 A1 Sep. 4, 2025

Related U.S. Application Data

(63) Continuation of application No. PCT/KR2025/000664, filed on Jan. 10, 2025.

(30) Foreign Application Priority Data

Mar. 4, 2024 (KR) ........................ 10-2024-0030776

(51) Int. Cl.
*G06T 11/60* (2026.01)
*G06V 10/44* (2022.01)
(Continued)

(52) U.S. Cl.
CPC .............. *G06T 11/60* (2013.01); *G06V 10/44* (2022.01); *G06V 20/47* (2022.01); *H04N 21/8549* (2013.01)

(58) Field of Classification Search
CPC ........ G06T 11/60; G06V 10/44; G06V 20/47; G06V 10/82; G06V 20/40; G06V 10/70;
(Continued)

(56) References Cited

U.S. PATENT DOCUMENTS 11,375,256 B1 * 6/2022 Dorner .................... G06F 18/24
11,568,647 B2 * 1/2023 Choi .................... G06N 3/0455
(Continued)

FOREIGN PATENT DOCUMENTS

KR 10-2016-0031619 A 3/2016
KR 10-2020-0001153 A 1/2020
(Continued)

OTHER PUBLICATIONS

International Search Report of International Application No. PCT/KR2025/000664 mailed Apr. 17, 2025.

*Primary Examiner* — Stefan Gadomski
(74) *Attorney, Agent, or Firm* — Revolution IP, PLLC

(57) ABSTRACT

According to various embodiments, an operating method of an electronic device may include obtaining a first video including a plurality of images from a user device connected to the electronic device, obtaining scene information about the first video through at least one artificial intelligence model, obtaining a second video obtained by editing the first video based on the scene information through at least one artificial intelligence model, wherein the scene information is information related to scene understanding of the plurality of images, obtaining a first emoticon based on the second video through at least one artificial intelligence model, and transmitting the first emoticon such that the user device outputs the first emoticon.

13 Claims, 13 Drawing Sheets

(51) Int. Cl.
*G06V 20/40* (2022.01)
*H04N 21/8549* (2011.01)

(58) Field of Classification Search
CPC .. G06V 20/41; H04N 21/8549; H04N 21/854; H04L 51/07; H04L 51/04; G06N 20/00; G06Q 50/10; G06Q 50/50
See application file for complete search history.

(56) References Cited

U.S. PATENT DOCUMENTS

| | | | | |
|---|---|---|---|---|
| 11,962,860 | B1 * | 4/2024 | Chen | H04L 51/52 |
| 2005/0163379 | A1 * | 7/2005 | Zimmermann | G06Q 10/107 704/E15.045 |
| 2010/0177116 | A1 * | 7/2010 | Dahllof | H04M 1/72436 382/218 |
| 2012/0069028 | A1 * | 3/2012 | Bouguerra | H04L 51/046 715/810 |
| 2014/0093222 | A1 * | 4/2014 | Degani | H04N 21/60 386/285 |
| 2015/0286371 | A1 * | 10/2015 | Degani | H04L 51/046 715/835 |
| 2016/0080298 | A1 * | 3/2016 | Oh | H04L 51/063 709/206 |
| 2018/0351895 | A1 * | 12/2018 | Rathod | A63F 13/31 |
| 2019/0206441 | A1 * | 7/2019 | De la Torre | G06V 40/171 |
| 2020/0029028 | A1 * | 1/2020 | Kim | H04N 7/147 |
| 2021/0081676 | A1 * | 3/2021 | Kim | G06V 20/47 |
| 2021/0158594 | A1 * | 5/2021 | Huang | H04N 5/2628 |
| 2021/0192800 | A1 | 6/2021 | Dutta et al. | |
| 2021/0357445 | A1 * | 11/2021 | Aguirre-Suarez | G06F 16/48 |
| 2022/0114776 | A1 * | 4/2022 | Xu | G06V 10/761 |
| 2022/0248080 | A1 * | 8/2022 | Strickland | H04N 21/242 |
| 2023/0007359 | A1 * | 1/2023 | Aher | H04N 21/4884 |
| 2023/0031999 | A1 * | 2/2023 | Lim | G06V 10/993 |
| 2023/0130806 | A1 * | 4/2023 | Wu | G11B 27/031 386/282 |
| 2023/0188830 | A1 * | 6/2023 | Chen | H04N 23/632 348/207.99 |
| 2023/0336816 | A1 * | 10/2023 | Ryou | H04N 19/59 |
| 2024/0033640 | A1 * | 2/2024 | Bean | G06V 10/70 |
| 2024/0364960 | A1 * | 10/2024 | Borzic | H04N 21/4666 |

FOREIGN PATENT DOCUMENTS

| | | |
|---|---|---|
| KR | 10-2021-0032745 A | 3/2021 |
| KR | 10-2022-0017068 A | 2/2022 |

* cited by examiner

ELECTRONIC DEVICE OR METHOD OF THE SAME FOR PROVIDING EMOTICON GENERATING

CROSS-REFERENCE TO RELATED APPLICATIONS

This application is a Continuation Application of International Application No. PCT/KR2025/000664, filed on Jan. 10, 2025, which is based on and claims priority to Korean Patent Application No. 10-2024-0030776, filed on Mar. 4, 2024, in the Korean Intellectual Property Office, the disclosures of which are incorporated by reference herein in their entireties.

BACKGROUND

1. Field

Various embodiments disclosed in this document relate to an electronic device providing an emoticon generation function or an operation method thereof.

2. Description of Related Art

Recently, a vision system that provides a function of understanding scenes of an image using an artificial intelligence model and identifying specific objects has been developed and used in various fields.

For example, in the computer vision field, a technology for interpreting various elements such as objects, environments, and situations in an image may be provided through a scene understanding technology using an artificial intelligence model. Through the scene understanding technology, a computer can infer things occurring in an image, and the inference may include object recognition, feature extraction, and situation recognition.

In addition, for example, deep learning-based semantic segmentation may be considered in relation to the artificial intelligence model that identifies objects in an image. The semantic segmentation is to divide an image into various classes and assign a pixel to the class, and may be used to predict which class the pixel belongs to each pixel and divide an object boundary in the image. Methods using Convolutional Neural Networks (CNN) are being studied for deep learning-based semantic segmentation.

SUMMARY

Recently, as various services using personal videos are activated, video content producers try to create more effective and attractive content through editing rather than exposing videos captured through a camera or the like. For such video editing, video content producers must select a specific image frame from a video including a plurality of image frames, and edit the selected image frames one by one. Therefore, there is a problem that there is a lot of time and effort for video editing.

In addition, as the messenger application service is activated, users want to transmit intentions or emotions more effectively through emoticons. The emoticon plays an important role in communication, and the user wants to create and use personally customized emoticons. However, in order for the user to create an individual emoticon, there is a problem in that the user needs a skill level for design ability and editing tools.

According to various embodiments of the present disclosure, a video may be automatically edited through a scene understanding technology for the video. For example, the electronic device may detect at least one object included in a specific image frame in the image, and add content (e.g., visual object) related to the at least one object to obtain the edited image.

According to various embodiments of the present disclosure, the emoticon may be automatically generated based on the obtained image. For example, the obtained image may be edited, and the emoticon may be obtained based on the edited image.

According to various embodiments, an electronic device includes a communication device, a storage device storing at least one artificial intelligence model trained to generate an emoticon based on an input video, and at least one processor, wherein the at least one processor is configured to obtain a first video including a plurality of images from a user device connected to the electronic device through the communication device, obtain a first emoticon by inputting the first video to the at least one artificial intelligence model, and transfer the first emoticon such that the user device outputs the first emoticon through the communication device, wherein the at least one artificial intelligence model is trained to obtain scene information about the first video, the scene information is information related to scene understanding of the plurality of images, and obtain a second video editing the first video based on the scene information, and generate the first emoticon based on the second video.

According to various embodiments, an operating method of an electronic device may include obtaining a first video including a plurality of images from a user device connected to the electronic device, obtaining scene information about the first video through at least one artificial intelligence model, the scene information is information related to scene understanding of the plurality of images, and obtain a second video editing the first video based on the scene information through the at least one artificial intelligence model, obtaining the first emoticon based on the second video through the at least one artificial intelligence model, and transferring the first emoticon such that the user device outputs the first emoticon.

According to various embodiments, an electronic device includes a display device, a storage device storing at least one artificial intelligence model trained to generate an edited video based on an input video, and at least one processor, wherein the at least one processor is trained to obtain a first video including a plurality of images, obtain a first emoticon by inputting the first video to the at least one artificial intelligence model, and output the first emoticon through the display device, wherein the at least one artificial intelligence model is trained to obtain scene information about the first video, the scene information is information related to scene understanding of the plurality of images, and obtain a second video editing the first video based on the scene information, and generate the first emoticon based on the second video.

According to various embodiments, a non-transitory computer-readable recording medium including a program that executes a control method of an electronic device that provides a video editing function, wherein the control method of the electronic device may include obtaining a first video including a plurality of images, obtaining scene information about the first video through the at least one artificial intelligence model, the scene information is information related to scene understanding of the plurality of images, and obtain a second video editing the first video based on the scene information through the at least one artificial intelligence model, obtaining a first emoticon based on the second video through the at least one artificial intelligence model, and transferring the first emoticon s such that the first emoticon is output.

According to various embodiments disclosed in this document, a video may be automatically edited through a scene understanding technique for the video. For example, the electronic device may detect at least one object included in a specific image frame in the video, and may add content (e.g., visual object) related to the at least one object to obtain the edited video. Therefore, the user may obtain the edited video more quickly and conveniently.

According to various embodiments of the present disclosure, the user may additionally edit the video automatically edited through the scene understanding technique for the video. Therefore, the user may obtain the edited video more quickly and conveniently and suitably for the user's intention by performing an additional video editing operation based on the primarily edited video.

According to various embodiments of the present disclosure, the emoticon may be automatically generated based on the obtained video. For example, the obtained video may be edited, and the emoticon may be obtained based on the edited video. Therefore, the user may easily and quickly produce more various emoticons.

In addition, various effects directly or indirectly identified through this document may be provided.

BRIEF DESCRIPTION OF THE DRAWINGS

In connection with the description of the drawings, the same or similar reference numerals may be used for the same or similar components.

DETAILED DESCRIPTION

Figure 1:
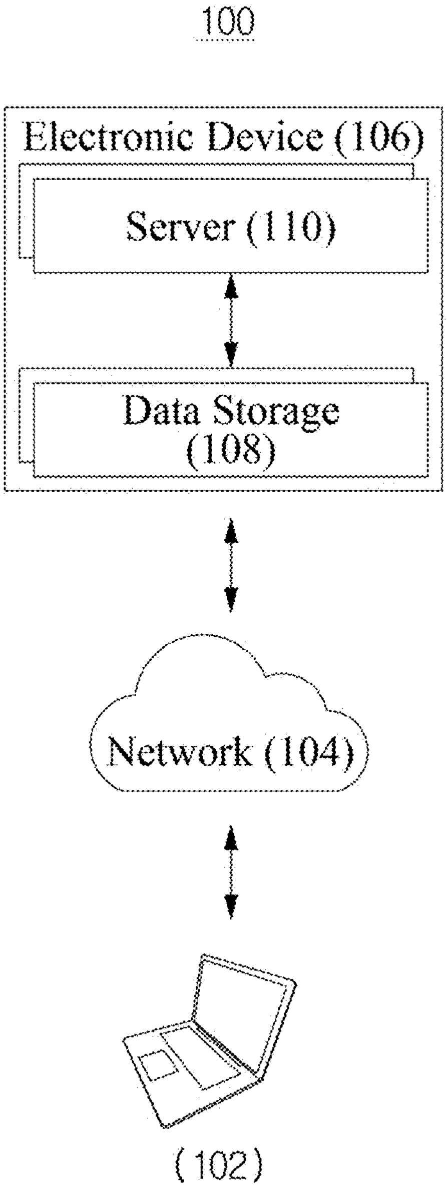
FIG. 1 is a diagram illustrating a system for providing a video editing function according to various embodiments.

Specific structural or functional descriptions of various embodiments are merely illustrated for the purpose of describing the various embodiments, and they should not be construed as being limited to the embodiments described in this specification or the application.

Various embodiments can be variously modified and have various forms, and thus various embodiments are illustrated in the drawings and will be described in detail in this specification or the application. However, it should be understood that the matter disclosed from the drawings is not intended to specify or limit various embodiments, but includes all modifications, equivalents, and alternatives included in the spirit and scope of the various embodiments.

The terms first and/or second, etc., may be used to describe various components, but the components should not be limited by the terms. The terms are only for the purpose of distinguishing one component from another component, for example, the first component may be named a second component, and similarly, the second component may be named a first component, without deviating from the scope of rights according to the concept of the present disclosure.

When an element is referred to as being "connected" or "connected" to another component, it should be understood that the element may be directly connected or connected to the other component, but other components may be present in the middle. On the other hand, when an element is referred to as being "directly connected" or "directly connected" to another component, it should be understood that there is no intervening component. Other expressions that describe the relationship between components, that is, "between" and "immediately between" or "adjacent to" and "directly adjacent to" should be interpreted as well.

The terminology used in this specification is used merely to describe a specific embodiment, and is not intended to limit various embodiments. The singular expression includes plural expressions unless the context clearly dictates otherwise. In this specification, it should be understood that the terms "include" or "have" are intended to designate the presence of stated features, numbers, steps, operations, components, parts or combinations thereof, but do not preclude the presence or addition of one or more other features, numbers, steps, operations, components, parts or combinations thereof.

Unless defined otherwise, all terms used herein, including technical or scientific terms, are the same meaning as commonly understood by one of ordinary skill in the art to which this disclosure belongs. Terms such as those defined in commonly used dictionaries should be interpreted to have a meaning that is consistent with the contextual meaning in the relevant art, and is not interpreted in an idealready or overly formal sense unless clearly defined in this specification.

Hereinafter, the present disclosure will be described in detail with reference to the preferred embodiments of the present disclosure with reference to the accompanying drawings. The same reference numerals shown in each drawing indicate the same members.

FIG. 1 is a diagram illustrating a video editing system that provides a video editing function according to various embodiments.

Referring to FIG. 1, the video editing system 100 may include a user device 102, a network 104, and an electronic device 106.

According to various embodiments, the user device 102 is a device including a marker device, and may be a mobile phone, a smartphone, a personal digital assistant (PDA), a notebook computer, a television (TV), a wearable device, or a head mounted device (HMD).

According to various embodiments, the user device 102 may include various output devices that may provide video content to a user. For example, the user device 102 may include at least one of an audio device, a display device, or at least one camera that may obtain a video.

According to various embodiments, the user device 102 may include various input devices that may obtain input from a user. For example, the user device 102 may include at least one of a keyboard, a touch pad, a key (e.g., a button), a mouse, a microphone, and a digital pen (e.g., a stylus pen).

According to various embodiments, the network 104 may include any variety of wireless communication networks suitable for coupling to communicate with the user device 102. For example, the network 104 may include a WLAN, a WAN, a PAN, a cellular, WMN, WiMAX, GAN, and 6LowPAN.

According to various embodiments, the electronic device 106 may include a standalone host computing system, an on-board computer system integrated with the user device 102, a mobile device, or any other hardware platform that may provide a video editing function and video content (e.g., emoticons) to the user device 102. For example, the electronic device 106 may include a cloud-based computing architecture suitable for servicing video editing executed in the user device 102. Accordingly, the electronic device 106 may include one or more servers 110 and a data storage 108. For example, the electronic device 106 may include a software as a service (SaaS), a platform as a service (PaaS), an infrastructure as a service (IaaS), or other similar cloud-based computing architecture.

The emoticons are languages in which emotion that refers to emotion and icons that refer to fragments are synthesized, and the emoticons of the present disclosure may be understood as concepts that include an animation emoticons and/or image emoticons as well as emojig, Kao-jig, or symbols. The emoticons of the present disclosure may include various digital content displayed through a display, without being limited to the expressed terms.

According to various embodiments, the electronic device 106 and/or the user device 102 may be configured as a single device that performs each function, without being limited to the illustrated example.

For example, the electronic device 106 may perform a function of the user device 102, including the configuration included in the user device electronic device 102. When the electronic device 106 provides the function of the user device 102, the electronic device 106 may provide the editing function for the video stored in the electronic device 106. For example, the electronic device 106 may obtain and store a video including a plurality of images, audio information, and/or caption information through a camera and a microphone. In addition, the electronic device 106 may edit the video based on a user input and output the edited video through a display device. In addition, the electronic device 106 may provide various functions related to the video (e.g., video summary, searching a specific scene in the video, and generating an emoticon based on the video).

Providing various functions related to the video by the electronic device 106 according to various embodiments will be described below.

Figure 2:
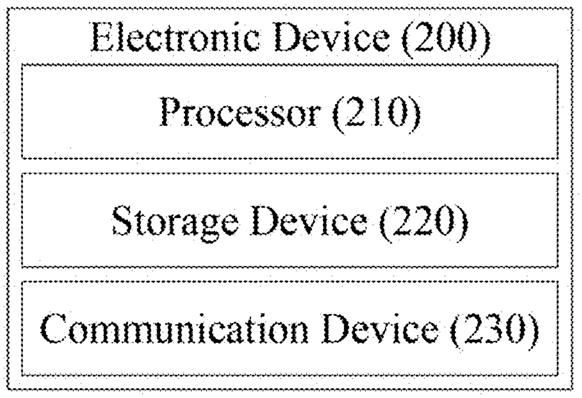
FIG. 2 is a block diagram of an electronic device according to various embodiments.

FIG. 2 is a block diagram of an electronic device 200 according to an embodiment.

Referring to FIG. 2, the electronic device 200 (e.g., the electronic device 106 of FIG. 1) may include a processor 210, a storage device 220 (e.g., the data storage 108 of FIG. 1), and/or a communication device 230. The above-enumerated components may be operatively or electrically connected to each other. The components of the electronic device 200 illustrated in FIG. 2 may be modified, deleted, or added in part as an example.

According to various embodiments, the electronic device 200 may include a processor 210. The processor 210 may include hardware for executing instructions, such as instructions constituting a computer program. For example, the processor 210 may search for (or patch) the instructions from an internal register, an internal cache, and the storage device 220 (including the memory) to execute the instructions, decode and execute them, and store the results in the internal register, the internal cache, and the storage device 220.

In various embodiments, the processor 210 may execute software (e.g., a computer program) to control at least one other component (e.g., a hardware or software component) of the electronic device 200 connected to the processor 210, and perform various data processing or calculations. According to various embodiments, as at least a part of the data processing or calculation, the processor 210 may store the instructions or data received from the other component (e.g., the communication device 230) in volatile memory, process the instructions or data stored in the volatile memory, and store the resultant data in non-volatile memory.

According to various embodiments, the processor 210 may include at least one of a central processing unit (CPU), a graphics processing unit (GPU), a micro controller unit (MCU), a sensor hub, an auxiliary processor, a communication processor, an application processor (ASIC), a field programmable gate array (FPGA), or a neural processing unit (NPU), and may have a plurality of cores.

According to various embodiments, the processor 210 (e.g., the neural network processing device) may include a hardware structure specialized for processing an artificial intelligence model. The artificial intelligence model may be generated through machine learning. The learning algorithm may include, for example, supervised learning, unsupervised learning, semi-supervised learning, or reinforcement learning, but is not limited to the above example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited to the above examples. The artificial intelligence model may additionally or alternatively include a software structure in addition to a hardware structure.

According to various embodiments, the processor 210 may obtain a first video including a plurality of images from a user device (e.g., the user device 102 of FIG. 1) through the communication device 230. For example, the first video may include a plurality of images having a series of temporal flows and a video including audio information and/or subtitle information corresponding to the plurality of images.

According to various embodiments, the first video may include a video captured through at least one camera of the user device 102. For example, the user may capture a video using the user device 102 and transmit the video to the electronic device 200 to edit the video.

According to various embodiments, the processor 210 may obtain scene information about the plurality of images by inputting the first video to at least one artificial intelligence model. For example, the processor 210 may obtain scene information, which is information related to scene-understanding of the plurality of images in the first video using a scene understanding model (e.g., the scene understanding model of the scene understanding module 303 described with reference to FIG. 3).

According to various embodiments, the processor 210 may obtain a second video obtained by editing at least a portion of the plurality of images based on the scene information through at least one artificial intelligence model. For example, the processor 210 may add at least one content related to a first image among the plurality of images based on the scene information through at least one artificial intelligence model and obtain a second video obtained by editing the first video by adding the at least one content.

According to various embodiments, the processor 210 may transmit the second video so that the user device 102 outputs the second video. For example, the processor 210 may transmit the second video to the user device 102 through the communication device 230.

According to various embodiments, the user device 102 that obtained the second video may output the second video through a display device (e.g., a display) included in the user device 102.

According to various embodiments, the storage device 220 may include a large storage for data or commands. For example, the storage device 220 may include a hard disk drive (HDD), a floppy disk drive, a flash memory, an optical disk, a magneto-optical disk, a magnetic tape, or a universal serial bus (USB) drive, or a combination of two or more of them.

According to various embodiments, the storage device 220 may include a non-volatile, solid-state memory, and read-only memory (rom). The rom may be mask-programmed rom, programmable rom (prom), erasable prom (eprom), electrically erasable prom (eeprom), electrically alterable rom (earom), or flash memory, or a combination of two or more of them.

Although this disclosure describes and illustrates a specific storage device, this disclosure contemplates any suitable storage device, and according to various embodiments, the storage device 220 may be inside or outside the electronic device 106.

According to various embodiments, the processor 210 may store the module related to the editing of the video described with reference to FIG. 3 in the storage device 220.

According to various embodiments, the processor 210 may execute calculations or data processing related to control and/or communication of at least one other components of the electronic device 200 using instructions stored in the storage device 220.

According to various embodiments, the electronic device 200 may include a storage device 220. According to various embodiments, the storage device 220 may store various data used by at least one component (e.g., the processor 210) of the electronic device 200. The data may include, for example, software (e.g., a program) and input data or output data for commands related thereto.

According to various embodiments, the program may be stored in the storage device 220 as software, and may include, for example, an operating system, middleware, or an application. According to various embodiments, the storage device 220 may store instructions that cause the processor 210 to process data or control components of the electronic device 200 to perform the operations of the electronic device 200 when executed. The instructions may include code generated by a compiler or code that can be executed by an interpreter.

According to various embodiments, the storage device 220 may store various information obtained through the processor 210. For example, the storage device 220 may store at least one of a plurality of images obtained from the processor 210, a video including a plurality of images, scene information about the video, order information of each of the plurality of images, information about image groups grouping a plurality of image frames, information about at least one object of each of the plurality of images, information about a point set group and a bounding box set for the at least one object output through an object recognition model, and user input information obtained from the user device 102. In addition, the storage device 220 may store identification information of the user device 102 connected to the electronic device 200.

According to various embodiments, the storage device 220 may store at least one artificial intelligence model trained to provide various functions based on the input video. For example, the storage device 220 may store a trained model to output information related to a specific scene in the video in response to a user request to search for a specific scene in the input video. In addition, for example, the storage device 220 may store a learned model to summarize the input video. In addition, the storage device 220 may store a model trained to generate a video editing (at least one content addition) the input video based on scene-understanding of the input video. In addition, the storage device 220 may store a model trained to automatically generate emoticons based on user input data (e.g., images, texts, sounds, videos, etc.). In this case, the emoticon may be provided in a video form. According to various embodiments, the electronic device 200 may store the learned model in the storage device 220 to provide various functions related to video processing, without being limited to the listed models. In this case, the model trained to provide the various functions may be configured as one artificial intelligence model or may be configured as a combination (e.g., ensemble model) of a plurality of models.

According to various embodiments, the electronic device 200 may include a communication device 230. In various embodiments, the communication device 230 may support the establishment of a direct (e.g., wired) communication channel or a wireless communication channel between the electronic device 200 and an external electronic device (e.g., the user device 102 of FIG. 1), and communication performance through the established communication channel. The communication device 230 may include one or more communication processors that operate independently from the processor 210 and support direct (e.g., wired) communication or wireless communication. According to an embodiment, the communication device 230 may include a wireless communication module (e.g., a cellular communication module, a short-range wireless communication module, or a global navigation satellite system (GNSS) communication module) or a wired communication module (e.g., a local area network (LAN) communication module, or a power line communication module).

Among these communication modules, a corresponding communication module may communicate with an external electronic device through a first network (e.g., the network 104 of FIG. 1) (e.g., a short-range communication network such as Bluetooth, WiFi direct (wireless fidelity direct), or IrDA (infrared data association)), or a second network (e.g., the network 104 of FIG. 1) (e.g., a long-range communication network such as a legacy cellular network, a 5G network, a next-generation communication network, the Internet, or a computer network (e.g., the network 104 of FIG. 1) (e.g., LAN or WAN)). The various types of communication modules may be integrated into one component (e.g., a single chip), or may be implemented as a plurality of separate components (e.g., a plurality of chips).

According to various embodiments, the electronic device 200 may transmit and receive various data to and from various external devices through the communication device 230. In addition, the electronic device 200 may store the obtained data in the storage device 220. For example, the electronic device 200 may obtain a video including a plurality of images from the user device 102 through the communication device 230. In addition, for example, the electronic device 200 may obtain a user input indicating a user request for the video through the communication device 230. For example, the electronic device 200 may obtain a user input to search for a specific scene for the video, a user input to generate a summary video for the video, a user input to generate an edited video for the video, and/or a user input to generate an emoticon based on the video through the communication device 230.

In addition, for example, the electronic device 200 may transmit information on a specific scene generated by executing the function of the electronic device 200, a summary video, an edited video, and/or emoticons to the user device 102 through the communication device 230. At this time, the request for modification of the information on the specific scene, the summary video, the edited video, and/or the emoticon may also be obtained from the user device 102 through the communication device 230.

According to various embodiments, the electronic device 200 may include a computer system. For example, the computer system may be at least one of a buried computer system, a system-on-chip (soc), a single-board computer system (sbc), a computer-on-module (com), a system-on-module (sm), a desktop computer system, a laptop or notebook computer system, a server, a tablet computer system, and a mobile terminal. For example, the electronic device 200 may include one or more computer systems residing in a cloud that may include one or more cloud components.

According to various embodiments, the electronic device 200 may perform one or more operations of one or more methods described or shown in this disclosure without substantial spatial or temporal limitation. In addition, the electronic device 200 may perform one or more operations of one or more methods described or shown in this disclosure in real time or in a deployment mode. For example, the electronic device 200 may perform one or more operations of one or more methods described or shown in this disclosure at different times or at different positions.

According to various embodiments, when the electronic device 200 described in this disclosure provides a function of the user device 102, the electronic device 200 may include at least one camera (not shown) and/or a display device (not shown). Hereinafter, the case where the electronic device 200 includes at least one camera (not shown) and/or a display device (not shown) will be described.

According to various embodiments, the processor 210 may obtain a first video including a plurality of images through at least one camera. For example, the processor 210 may activate the at least one camera based on a start photographing command and obtain the first video including a plurality of image frames, audio information, and/or caption information through the at least one camera.

According to various embodiments, the processor 210 may obtain scene information about a plurality of images included in the first video using at least one artificial intelligence model. For example, the processor 210 may obtain information related to scene understanding of each of the plurality of images by inputting the first video to at least one artificial intelligence model trained to perform a scene understanding function and obtain a second video obtained by adding at least one content to the first video based on the scene information.

According to various embodiments, the processor 210 may control the display device so that the display device outputs the second video. For example, the processor 210 may output the second video through the display device included in the electronic device 200.

According to various embodiments, the processor 210 may obtain user input for various information (e.g., specific scene information, summary video, edit video, and emoticons) about the video obtained through the at least one artificial intelligence model. For example, the processor 210 may obtain user input through an input device included in the electronic device 200 (e.g., a keyboard, a touch pad, a key (e.g., button), a mouse, a microphone, and a digital pen (e.g., stylus pen)).

According to various embodiments, the processor 210 may modify and provide the various information based on the user input. According to one embodiment, the processor 210 may obtain user input for a second video that is an edit video of the first video obtained based on the scene understanding. For example, the processor 210 may additionally add at least one content to the second video or obtain a user input to delete the added content. In this case, the processor 210 may obtain a third video obtained by editing the first video based on the user input.

Figure 3:
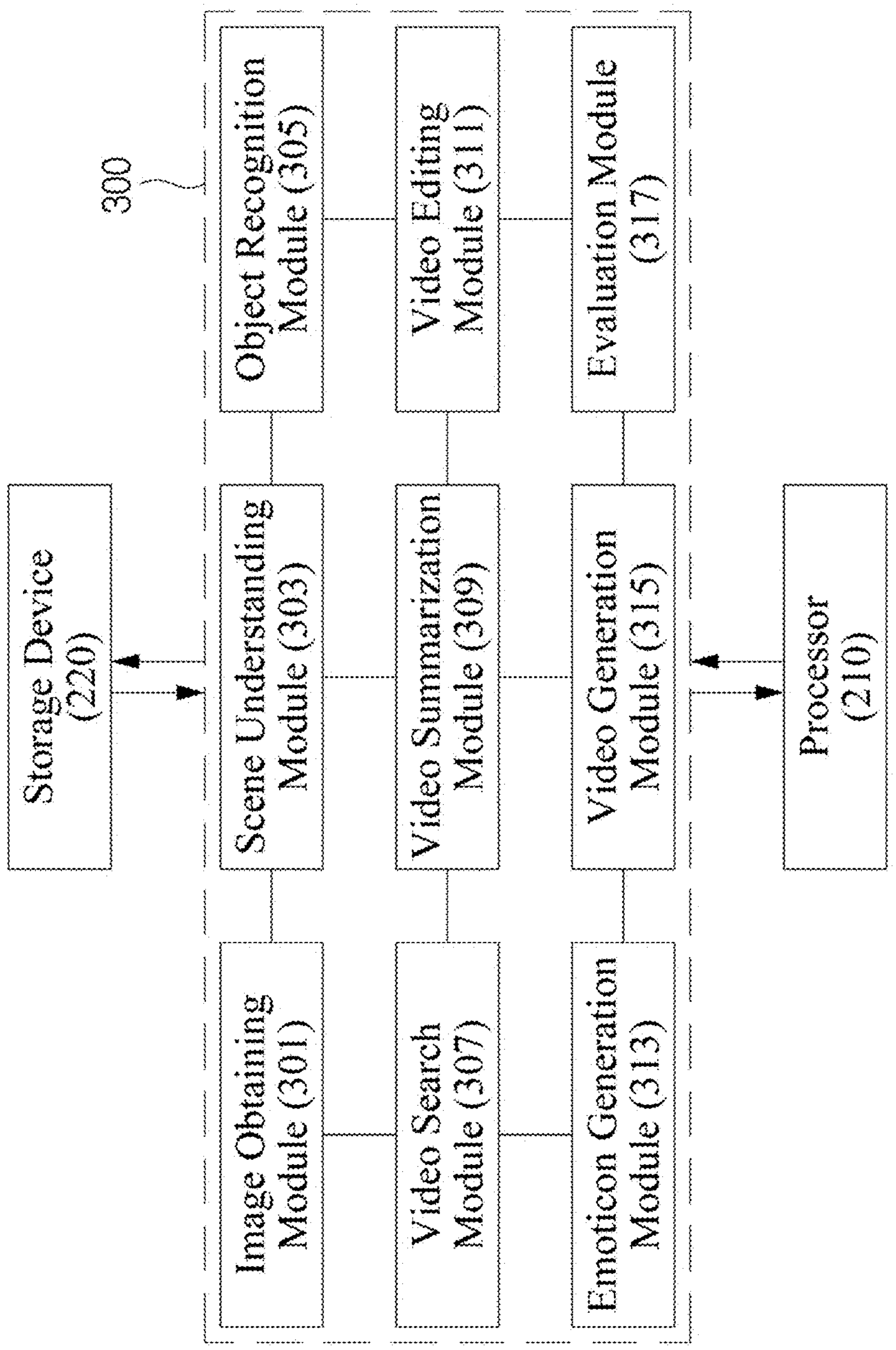
FIG. 3 illustrates a concept of controlling a function related to video editing in an electronic device according to various embodiments.

FIG. 3 illustrates a concept of controlling a function related to video editing in an electronic device according to various embodiments.

Referring to FIG. 3, the electronic device 200 may use hardware and/or software module 300 to support various functions related to video editing. For example, the processor 210 may execute the instructions stored in the storage device 220 to drive the video obtaining module 301, the scene understanding module 303, the object recognition module 305, the video search module 307, the video summary module 309, the video editing module 311, the emoticon generation module 313, the video generation module 315, and/or the evaluation module 317. In various embodiments, a software module different from that shown in FIG. 3 may be implemented. For example, at least two modules may be integrated into one module or one module may be divided into two or more modules. In addition, the hardware and software modules may share one function to improve work performance. For example, the electronic device 200 may include both a hardware encoder and a software encoder, and some of the data obtained through the at least one camera module may be processed by the hardware encoder and the other by the software encoder.

According to various embodiments, the video obtaining module 301 may provide a user interface (UI)/graphical UI (GUI) related to video upload to a user through the user device 102 and obtain a video (e.g., the first video described with reference to FIG. 2) through the user device. For example, the video may be obtained by controlling a function related to video upload in response to a user input provided through the UI/GUI output through the display device of the user device 102. In addition, the video obtaining module 301 may extract a plurality of image frames, audio information, and/or subtitle information of the video obtained through the user device 102.

According to various embodiments, the scene understanding module 303 may obtain scene information about the obtained video. The scene understanding module 303 may be a model trained to understand the scene of the input video and a plurality of images included in the video through various learning data.

According to various embodiments, the scene understanding module 303 may be configured as an artificial neural network model. For example, the scene understanding module 303 may be a deep neural network model trained to extract information about the object by recognizing the object included in the input video, extract features from each part of the image included in the video, extract spatial information such as the arrangement, relative position, depth, etc. For example, the scene understanding module 303 may be trained using a neural network structure s such as a transformer architecture or a convolutional neural network model (CNN). However, the s s of the present disclosure are not limited to the above-described neural network models and other suitable neural network models may be implemented.

According to various embodiments, the scene understanding module 303 may generate scene information by understanding and interpreting the environment of the obtained video. For example, the scene understanding module 303 may understand and infer the video and the images included in the video to obtain scene information according to object recognition, feature extraction, and situation recognition.

According to an embodiment, the scene understanding module 303 may generate image groups by grouping a plurality of images included in the input video based on the scene information. For example, the scene understanding module 303 may generate image groups by grouping a plurality of images included in the video obtained through the video obtaining module 301 into pre-set reference units based on the scene information. For example, the scene understanding module 303 may recognize a scene change of the video based on the scene information, and generate image groups by grouping a plurality of images of the video based on the scene change.

According to various embodiments, the object detection model 305 may include an object detection model trained to detect a point set and a bounding box of at least one object included in the video. For example, the object detection model may be a model trained to detect a point set and a bounding box of at least one object through various learning data.

According to various embodiments, the learning data for learning the object detection model may include learning data obtained by distinguishing background from at least one object in a plurality of image frames included in the video and assigning a label corresponding to the background and a label corresponding to each of the at least one object.

According to various embodiments, the object recognition module 305 may be configured as an artificial neural network model. For example, the object recognition module 305 may be a deep neural network model trained to extract a key-point set and a bounding box set for at least one object in the video by identifying and tracking the object in the video. For example, the object detection model may be implemented as a region-based convolutional neural network model (Region-based Convolution Neural Network, R-CNN), a high speed region-based convolutional neural network model (Faster Region-based Convolution Neural Network, Faster R-CNN), a single-shot multibox detector model (Single Shot multibox Detector, SSD), YOLO v4, CenterNet, or MobileNet. However, the object detection model of the present disclosure is not limited to the above-described deep neural network model, but may be implemented as another suitable neural network model.

According to various embodiments, the object recognition module 305 may obtain a point set by extracting skeleton data of at least one object included in the video. For example, the object recognition module 305 may obtain a point set by extracting skeleton data of at least one object included in the video and extracting skeleton data of the extracted skeleton data of the extracted skeleton data. For example, when the object is a human object or an animal, the joint portion or a specific portion of the object may be detected. In addition, when the object is a human object, the body part such as the head, eye, nose, mouth, ear, neck, shoulder, elbow, wrist, fingertip, torso, hip joint, wrist, knee, ankle, and fingertip may be extracted. The skeleton data may be represented by xy coordinate values as coordinates in the video to constitute a point set.

According to various embodiments, the object recognition module 305 may use a kinematics data set or a kinematics detection algorithm such as NTU-RGB-D (Nanyang Technological University's Red Blue Green and Depth information) data set to extract skeleton data of a body joint or a specific part to obtain a point set. At this time, the number of skeleton joints per at least one object may be arbitrarily defined.

According to various embodiments, the object recognition module 305 may track at least one object of the video. For example, at least one object recognized from a plurality of images included in the video may be tracked to track at least one object change in a plurality of image frames. For example, when a plurality of objects is included in the image, the object recognition module 305 may extract skeleton data for each of the plurality of objects to obtain a point set, and generate and track a layer for each of the plurality of objects. According to various embodiments, when a plurality of objects included in the video are recognized for each specific time interval, a layer may be generated for each time interval in which each object is recognized.

According to various embodiments, the object recognition module 305 of the electronic device 200 may include an encoder and a decoder for extracting a bounding box set from a plurality of image frames in the video.

According to various embodiments, the encoder and the decoder may be connected to a network having an overlapped u-shaped structure. The overlapped u-shaped structure may extract multi-scale features of an intra-stage and more effectively combine them. The encoder may extract and compress features from an image frame of the video to generate context information. The decoder may be configured to output the bounding box set based on segmentation by expanding a feature map including the context information.

According to various embodiments, the object recognition module 305 may identify the position and the contour of the at least one object with higher accuracy by using both the point set and the bounding box for each of the at least one object of the plurality of image frames using the object recognition model.

According to various embodiments, the scene understanding module 303 and the object recognition module 305 may be configured as one module. For example, since the scene information provided by the scene understanding module 303 includes identification information on the object, the functions of the object recognition module 305 described above may be performed in the scene understanding module 303.

According to various embodiments, the video search module 307 may search for a specific s s from the images obtained through the video obtaining module 301 to generate information on the specific ss. For example, the video search module 307 may provide the obtained video to the user and provide ui/gui for the user input of the video to the user to obtain the user input to search for a specific scene for the video. According to various embodiments, the video search module 307 may understand the scene of the video through the scene understanding module 303 based on the user input, extract the scene (or image, section video) corresponding to the specific scene, and output information about the specific scene.

According to an embodiment, the video search module 307 may be implemented with at least one artificial intelligence model to perform a function of outputting information about the specific scene. For example, the video search module 307 may include a first artificial intelligence model trained to recognize the user's intention of what the scene the user wants to search within the video according to the user input and output search information. Also, for example, the video search module 307 may include a second artificial intelligence model trained to receive the search information and the video and output information about the scene of what the specific scene the user wants to search.

According to various embodiments, the video summarization module 309 may generate information about the summary video that summarizes the video obtained through the video obtaining module 301. For example, the video summarization module 309 may provide the obtained video to the user and provide ui/gui for the user input of the video to the user to obtain the summary request for the video and/or the user input including the summary criteria. According to various embodiments, the video summarization module 309 may understand the scene of the video through the scene understanding module 303 based on the user input, and output information about the summary video based on the user input.

According to an embodiment, the video summarization module 309 may be implemented with at least one artificial intelligence model to perform a function of outputting the summary video for the input video. For example, the video summarization module 309 may automatically output the summary video for the input video or may recognize the user's intention according to the user input and output the summary video according to the summary criteria. According to an embodiment, the video summarization module 309 may include a first artificial intelligence model trained to recognize the user's intention and output reference information of the video summary to perform the function. Also, for example, the video summarization module 309 may include a second artificial intelligence model trained to receive the reference information and the video and output the summary video that summarizes the video according to the user's intention. According to various embodiments, the first artificial intelligence model and the second artificial intelligence model of the video summarization module 309 may be configured as one model, without being limited to the above disclosed examples.

According to various embodiments, the video editing module 311 may add at least one content to the video obtained through the video obtaining module 301 and generate edited videos that edit the input image. For example, the image editing module 311 may obtain the scene information for the video obtained through the s scene understanding module 303.

According to an embodiment, the video editing module 311 may generate at least one content to be added to the video based on the scene information obtained through the scene understanding module 303. For example, the video editing module 311 may generate at least one content to be added to the video using at least one artificial intelligence model. In an embodiment, the at least one content may be generated based on the input video and scene information on a plurality of images included in the video. At this time, the at least one content may be generated based on scene information on a scene (image) to which the at least one content is to be added.

According to various embodiments, the video editing module 311 may generate the at least one content and add the at least one content to the input video to generate an edited video. For example, the video editing module 311 may generate at least one content in relation to the first image in the video input through the video obtaining module 301 and generate a second image by adding the at least one content to the first image. In addition, a video may be generated by editing the inputted video based on the second image. At this time, the video editing module 311 may generate the video using the video generation module 315.

According to an embodiment, the video editing module 311 may obtain a point set and a bounding box set for at least one object included in the video by using the object recognition module 305 for the video obtained through the video obtaining module 301. In addition, the video editing module 311 may identify the outline of the at least one object based on the point set and the bounding box set, and obtain object information about the at least one object based on the outline of the at least one object. For example, the video editing module 311 may obtain first scene information using the scene understanding module 303 for the first image included in the video obtained through the video obtaining module 301, and obtain a point set and a bounding box set for at least one object included in the first image using the object recognition module 305. In addition, object information about at least one object may be obtained based on the first scene information and the outline of the at least one object.

According to various embodiments, the video editing module 311 may determine a position at which at least one content is to be added in relation to the first image based on the object information. For example, when at least one content is added to the first image included in the first video, the video editing module 311 may determine the position to which the at least one content is to be added based on the point set and bounding box set obtained through the object recognition module 305 and the first scene information obtained through the scene understanding module 303. The video editing module 311 may generate a second image by adding the at least one content to the first image based on the position.

According to various embodiments, the video editing module 311 may obtain scene information about the input video and object information about at least one object, and determine the type and position of at least one content to be added to the video based on the scene information and the object information. According to an embodiment, when the type of the at least one content is a visual object, the video editing module 311 may determine image in a video in which the visual object is to be displayed based on the scene information and the object information, and determine which region the visual object is to be displayed in the image.

According to various embodiments, the user may obtain an edited video more conveniently and faster through the electronic device 200. In addition, the user may obtain an edited video by adding at least one content to a more accurate position through the electronic device, thereby obtaining a video such as an actual edited video by the user.

According to various embodiments, the video editing module 311 may provide the obtained video to the user, and may provide ui/gui for the user input of the video to the user to obtain a user input that wants to request editing of the video. For example, the video editing module 311 may provide the primarily completed edited video to the user. In this case, the video editing module 311 may generate a video by additionally editing the edited video based on the user input of the edited video. In an embodiment, even in generating the additionally edited video, the video editing module 311 may generate an additionally processed edited video reflecting the user input based on the scene information and the object information.

According to an embodiment, the video editing module 311 may be implemented as at least one artificial intelligence model and may perform a function of outputting an edited video for the input video. For example, the video editing module 311 may generate at least one content to be included in the first video through the first artificial intelligence model based on the input video. In addition, the video editing module 311 may output an edited video by adding the at least one content based on the scene information and the object information of the input video. According to various embodiments, the function provided by the video editing module 311 may be provided through one artificial intelligence model or through a plurality of artificial intelligence models.

According to various embodiments, the emoticon generation module 313 may generate an emoticon that can be used in a messenger application or the like based on the input video. According to various embodiments, the emoticon generation module 313 may obtain a user input by providing ui/gui for a user input related to generating an emoticon. According to an embodiment, the emoticon generation module 313 may obtain a user input that requests the emoticon generation, and may generate an emoticon through at least one artificial intelligence model based on the user input. The at least one artificial intelligence model may be a model that is learned to recognize the user's intention in the user input and output an emoticon corresponding to the user intention.

According to an embodiment, the emoticon generation module 313 may obtain a video that will be used to generate an emoticon as the user input. In an embodiment, the emoticon generation module 313 may obtain scene information about a video input through the scene understanding module 303 and obtain object information through the object recognition module 305. In an embodiment, the emoticon generation module 313 may generate an emoticon using at least one artificial intelligence model through the inputted video, the scene information, and/or object information.

For example, the emoticon generation module 313 may obtain a video as a user input requesting emoticon generation, and obtain a summary video to be emoticonized through the video summarization module 309 based on the scene information and the object information. The emoticon generation module 313 may generate an emoticon available in a messenger application based on the summary video.

For example, the emoticon generation module 313 may obtain a video as a user input requesting emoticon generation, and obtain an edited video to be emoticonized through the video editing module 311 based on the scene information and the object information. The emoticon generation module 313 may generate an emoticon available in a messenger application based on the edited video.

According to various embodiments, the emoticon generation module 313 may generate an emoticon through the functions of the above-described scene understanding module 303, the object recognition module 305, the video summarization module 309, and/or the video editing module 311.

According to various embodiments, the video generation module 315 may generate information output through the video search module 307, the video summarization module 309, and/or the video editing module 311 as a video. For example, when a specific scene is searched in the first video through the video search module 307, the video generation module 315 may generate a video including the specific scene based on information about the specific scene. In addition, for example, when information about a summary video is output through the video summarization module 309, the video generation module 315 may generate a summary video. In addition, when editing information about a video input through the video editing module 311 is output, the video generation module 315 may generate an edited video.

According to various embodiments, the video generation module 313 may obtain a corrected video obtained by encoding various information based on the inputted video based on data provided from the video search module 307, the video summarization module 309, the video editing module 311, and/or the emoticon generation module 313.

According to various embodiments, the video generated through the video generation module 315 may be transmitted to be viewed to the user. For example, the electronic device 200 may transmit the video to the user device 102 through the communication device 230.

According to various embodiments, the evaluation module 317 may provide the UI/GUI related to the feedback of the result output from the video search module 307, the video summarization module 309, the video editing module 311, and/or the emoticon generation module 313 (e.g., the searched video, summary video, edited video, and emoticon) to the user through the user device 102, and obtain user feedback through the user device. Accordingly, according to various embodiments, the evaluation module 317 may obtain feedback information indicating user satisfaction with respect to the output result, and may re-learn at least one of the scene understanding module 303, the object recognition module 305, the video search module 307, the video summarization module 309, the video editing module 311, and/or the emoticon generation module 313 using the feedback information.

According to various embodiments, the evaluation module 317 may control at least one of the scene understanding module 303, the object recognition module 305, the video search module 307, the video summarization module 309, the video editing module 311, and/or the emoticon generation module 313 to be specialized to a user using the obtained feedback information. For example, the video editing module 311 may obtain feedback information indicating user satisfaction with respect to the edited video obtained by editing the video, and may re-learn the artificial intelligence model included in the video editing module 311 using the feedback information to provide a user-customized video editing model. Alternatively, the evaluation module 317 may be controlled to store user input information related to emoticon generation through the emoticon generation module 313, and generate the emoticon based on the stored input information (e.g., using a macro method, history information) even if the user does not repeatedly input through the user device again.

In the embodiment of FIG. 3, it can be understood that the function performed through the video obtaining module 301, the scene understanding module 303, the object recognition module 305, the video search module 307, the video summarization module 309, the video editing module 311, the emoticon generation module 313, the video generation module 315, and/or the evaluation module 317 is performed by executing the instructions stored in the storage device 220. In addition, in various embodiments, the electronic device 200 may use one or more hardware processing circuits to perform various functions and operations disclosed in this document.

In addition, the connection relationship between the hardware/software shown in FIG. 3 is for convenience of explanation, and does not limit the flow/direction of data or instructions. The components included in the electronic device 200 may have various electrical/operative connection relationships.

Figure 4:
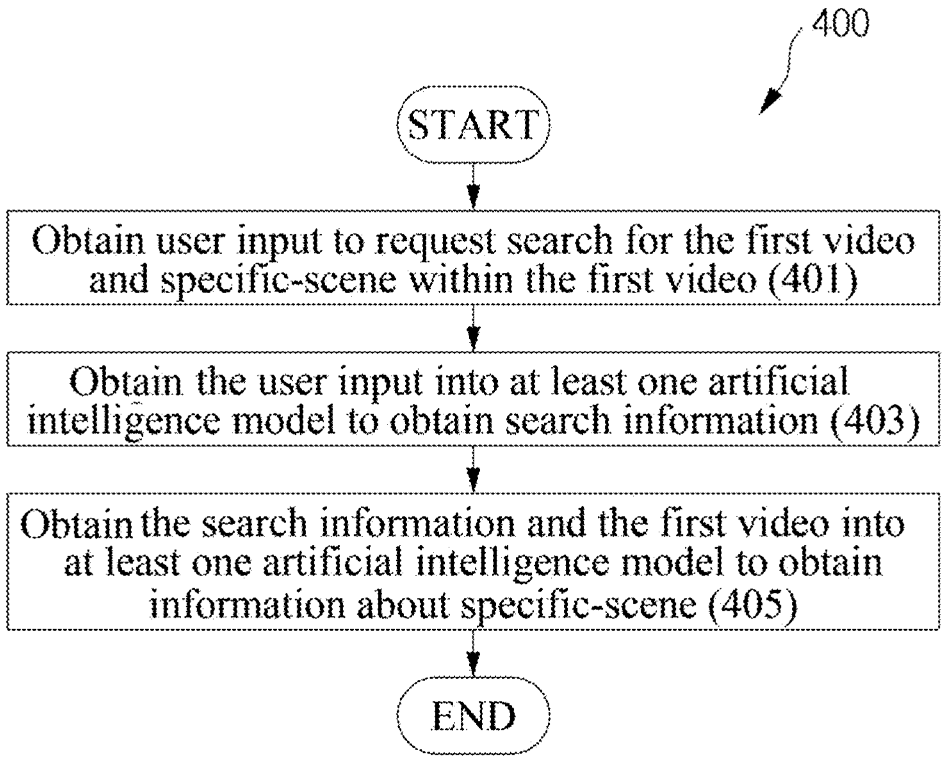
FIG. 4 is a flowchart illustrating an operation of providing information about a specific scene in a video according to a user request by an electronic device according to various embodiments.

FIG. 4 is a flowchart 400 illustrating an operation in which the electronic device generates a video from which a region excluding at least one object is removed according to various embodiments.

Figure 5:
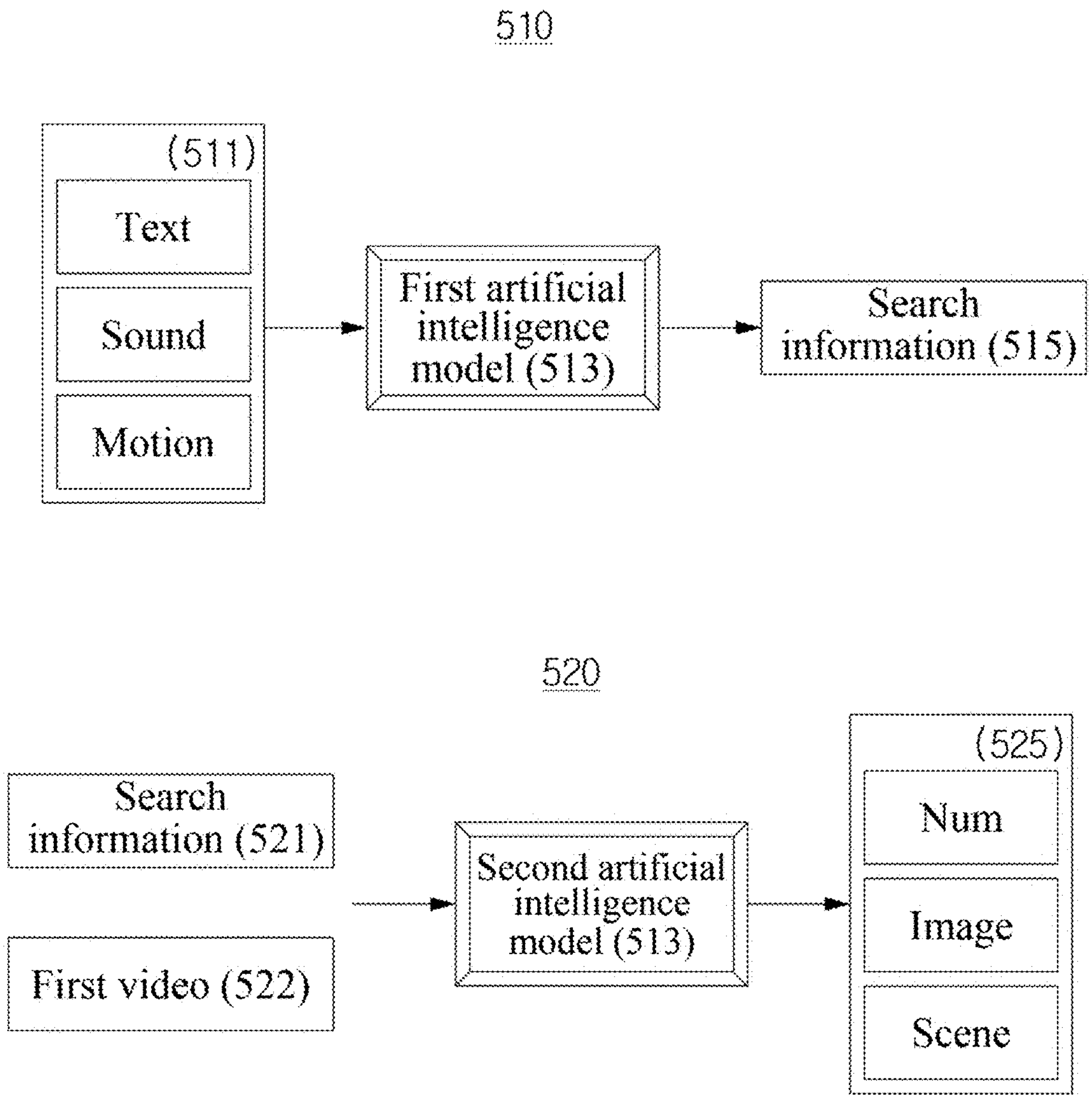
FIG. 5 is a diagram for explaining providing information about a specific scene in a video using an artificial intelligence model according to various embodiments.

FIG. 5 is a diagram for explaining providing information on a specific scene in a video using an artificial intelligence model according to various embodiments.

Each of the operations described in this document may be performed in combination with each other. In addition, the operations described in this document are not limited to the order shown, and may be performed in various orders, or may be performed more operations, or may be performed less operations. Among the operations described below, the operation by the electronic device 200 (e.g., the electronic device 106 of FIG. 1) may mean the operation by the processor 210 of the electronic device 200.

In addition, the “information” described below may be interpreted as meaning “data” or “signal”, and “data” may be understood as concepts including both analog data and digital data.

Referring to FIG. 4, in operation 401, the electronic device 200 may obtain a user input for requesting a search for a specific scene in the first image and the first image. For example, the electronic device 200 may obtain a user input for requesting a search for a specific scene in the first image through the user device 102. The user input may be obtained in various forms such as video, text, sound, image, motion (e.g., gesture), and the like.

According to various embodiments, in operation 403, the electronic device 200 may obtain search information by inputting the user input to at least one AI model. For example, referring to the first flow 510 of FIG. 5, the electronic device 200 may obtain search information 515 by inputting the user input 511 to the first AI model 513. According to various embodiments, the first AI model 513 may be a model trained to recognize user intention based on the user input.

According to various embodiments, in operation 405, the electronic device 200 may obtain information on a specific scene by inputting the search information and the first video to at least one AI model. For example, referring to the second flow 520 of FIG. 5, the electronic device 200 may obtain information 525 on a specific scene by inputting the search information 521 (e.g., the search information 515) and the first video 522 to the second AI model 523. According to an embodiment, the information 525 on the specific scene may be output in various forms. For example, the information on the specific scene may include an image order (Num) in the first video, an image for the specific scene, and/or a specific scene. In various embodiments, the electronic device 200 may generate an image related to the specific scene through the video search module 307 and the video generation module 315 described with reference to FIG. 3.

According to various embodiments, the electronic device 200 may obtain information 525 on a specific scene by executing the functions of the video search module 307 and the video generation module 315 described with reference to FIG. 3. Therefore, the operations of the electronic device 200 related to the search for the specific scene described with reference to FIG. 3 may be applied identically or similarly.

According to various embodiments, the electronic device 200 may transmit the user device 102 to output the information 525 on the specific scene. For example, the electronic device 200 may transmit the information on the specific scene to the user device 102 through the communication device 230.

Figure 6:
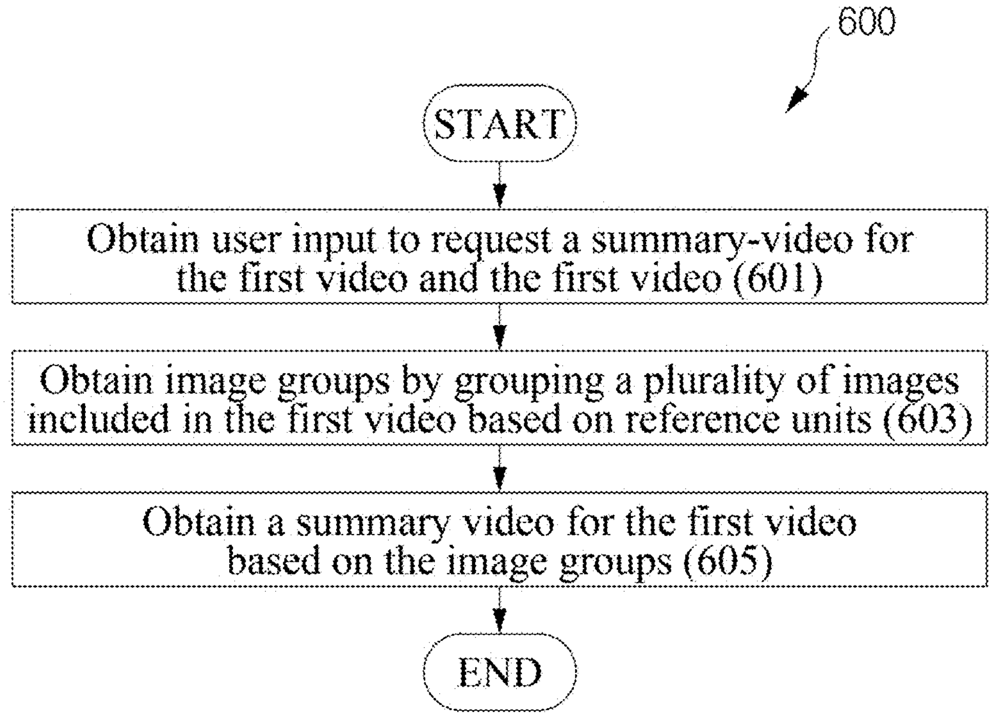
FIG. 6 is a flowchart illustrating an operation of obtaining a summary video based on a video input by an electronic device according to various embodiments.

FIG. 6 is a flowchart 600 illustrating an operation of obtaining a summary video based on a video input by the electronic device according to various embodiments.

Figure 7:
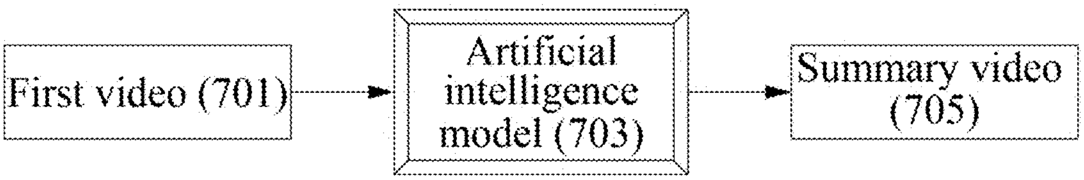
FIG. 7 is a diagram for explaining obtaining a summary video using an artificial intelligence model according to various embodiments.

FIG. 7 is a diagram for describing obtaining a summary video using an AI model according to various embodiments.

Referring to FIG. 6, in operation 601, the electronic device 200 may obtain a user input for requesting a summary video for the first video and the first video. For example, the electronic device 200 may obtain the user input for requesting a summary for the first video through the user device 102. The user input may include a video that is a target of the summary. In additionally, the user input may include additional requests items related to the summary or the summary. The additional request may be obtained in various forms such as text, sound, image, motion (e.g., gesture), and the like.

According to various embodiments, in operation 603, the electronic device 200 may obtain image groups obtained by grouping a plurality of images included in the first video in a reference unit.

According to various embodiments, in operation 605, the electronic device 200 may obtain a summary video for the first video based on the image groups.

Referring to FIG. 7, the electronic device 200 according to various embodiments may obtain the summary video 705 for the first video 701 through at least one AI model 703. For example, the electronic device 200 may obtain image groups obtained by grouping a plurality of images included in the first video 701 in a reference unit based on the at least one AI model 703.

According to an embodiment, the electronic device 200 may recognize the scene change of the first video through the scene understanding module 303 and/or the object recognition module 305 described with reference to FIG. 3. For example, the electronic device 200 may obtain scene information for the first video through the scene understanding module 303, and generate image groups by grouping a plurality of images included in the first video based on the scene information. For example, the electronic device 200 may recognize the scene change of the first video based on the scene information, and generate image groups by grouping a plurality of images of the video based on the scene change.

According to various embodiments, the electronic device 200 may also identify at least one object included in each of the plurality of images of the first video through the scene understanding module 303 and/or the object recognition module 305, and recognize the scene change based on at least one of the change of the at least one object, the change of the type of the at least one object, the change of the number of the at least one object, the change of the main color value of each of the plurality of images, the audio information of the first video, the caption information of the first video, the order information of the plurality of images, the photographing time information of each of the plurality of images, and the user input for image grouping. In addition, the image groups may be generated by grouping a plurality of images of the first video based on the scene change.

According to various embodiments, the electronic device 200 may obtain the summary video for the first video based on the image groups. For example, the electronic device 200 may obtain at least one group of image groups generated for the first video as the summary video, and/or may obtain at least one image from each of the images included in the image groups as the summary video.

However, without limitation, according to various embodiments, the electronic device 200 may obtain the summary video 705 for the first video 701 using the at least one AI model 703. For example, even if the grouping operation for the images included in the first video is not performed, the electronic device 200 may obtain the summary video 705 based on the first video 701 using the at leastaking learned to output the summary video. In this case, the electronic device 200 may obtain the summary video 705 based on the scene information and/or object information obtained from the scene understanding module 303 and/or the object recognition module 305. In an embodiment, when an additional request related to video summary is obtained by using a user input, the electronic device 200 may interpret the user additional request using at least one artificial intelligence model 703, and generate a summary video 705 using scene information and/or object information based on the additional request.

In various embodiments, various techniques related to natural language interpretation well-known to those skilled in the art related to interpreting the user input (text, sound, image, or motion (e.g., gesture) may be applied. Therefore, the description thereof may be omitted.

According to various embodiments, the electronic device 200 may obtain the summary video 705 (or information about the summary video) by executing the functions of the video summarization module 309 and the video generation module 315 described with reference to FIG. 3. Therefore, the operations of the electronic device 200 related to generating the summary video described with reference to FIG. 3 may be applied identically or similarly.

According to various embodiments, the electronic device 200 may transmit the user device 102 to output the summary video 705. For example, the electronic device 200 may transmit the summary video 705 (or information about the summary video) to the user device 102 through the communication device 230.

Figure 8:
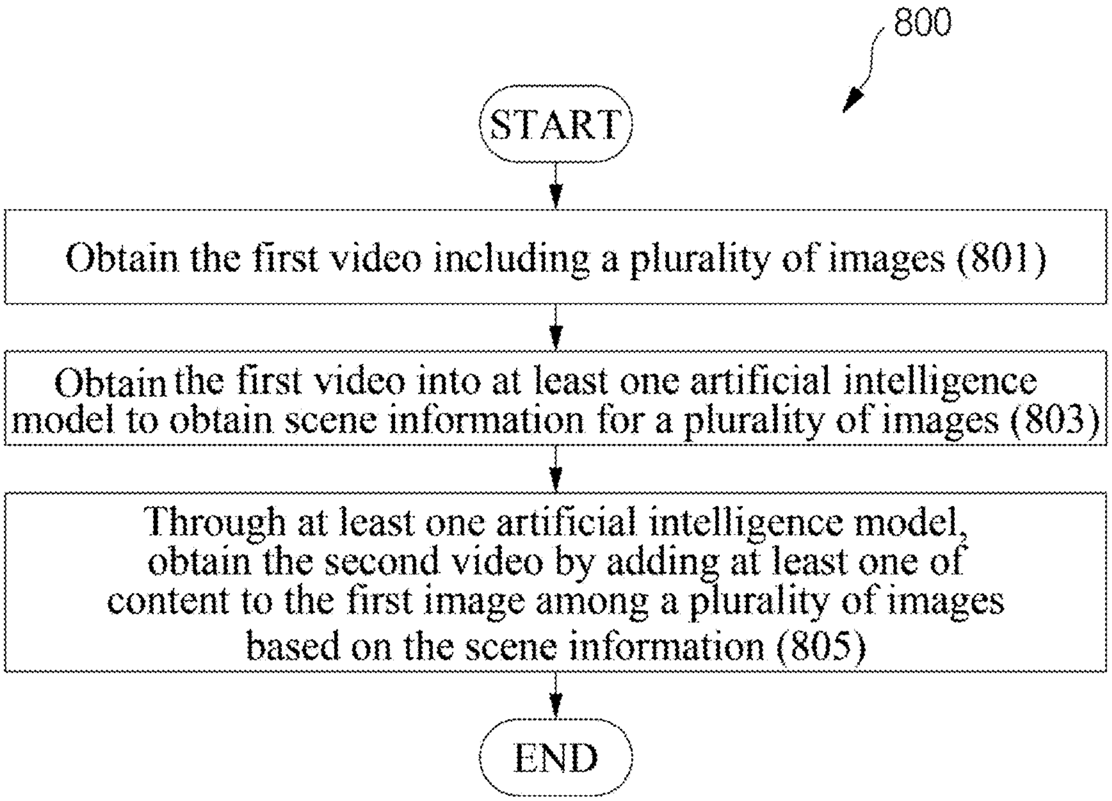
FIG. 8 is a flowchart illustrating an operation of providing a video edited by an electronic device according to various embodiments.

FIG. 8 is a flowchart 800 illustrating an operation of providing an edited video by an electronic device according to various embodiments.

Figure 9:
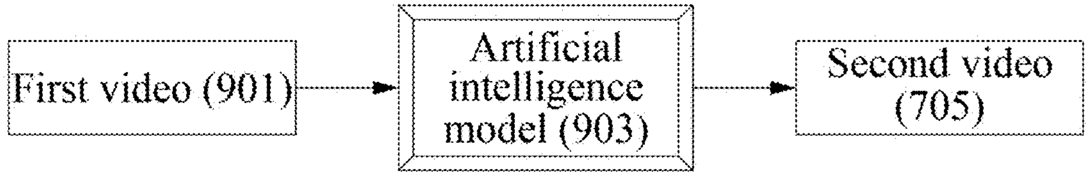
FIG. 9 is a diagram for explaining obtaining a video edited using an artificial intelligence model according to various embodiments.

FIG. 9 is a diagram illustrating obtaining an edited video by using an artificial intelligence model according to various embodiments.

Figure 10:
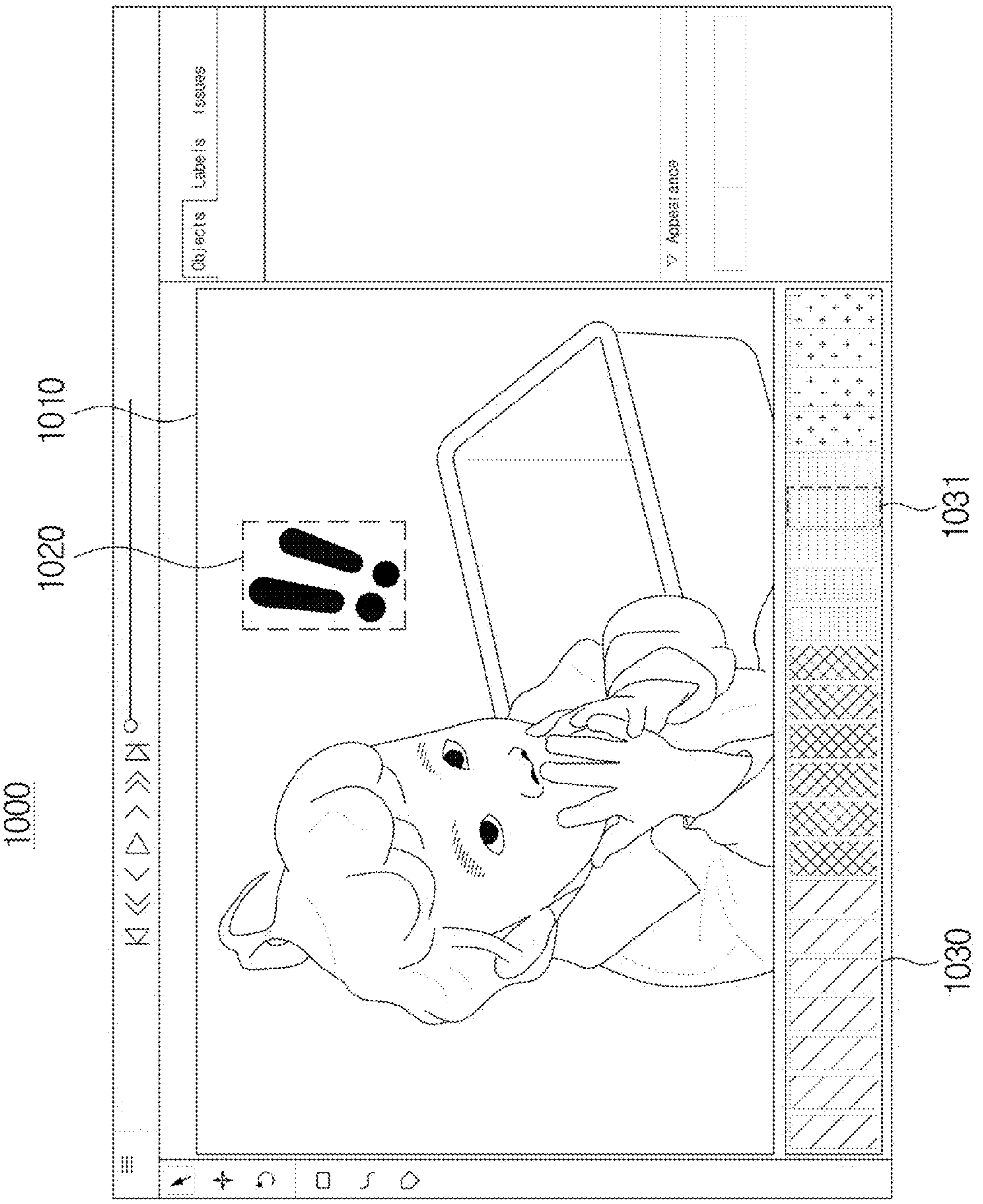
FIG. 10 illustrates an execution screen related to video editing output through a user device according to various embodiments.

FIG. 10 shows an execution screen 1000 related to video editing output through a user device according to various embodiments.

Referring to FIG. 8, in operation 801, the electronic device 200 may obtain a first video including a plurality of images.

According to various embodiments, in operation 803, the electronic device 200 may obtain scene information about the plurality of images by inputting the first video to the at least one artificial intelligence model.

According to various embodiments, in operation 805, the electronic device 200 may obtain a second video obtained by adding at least one content related to the first image from among the plurality of images based on the scene information.

Referring to FIG. 9, for example, the electronic device 200 may obtain the second video 905 by inputting the first video 901 to the at least one artificial intelligence model 903. According to various embodiments, the at least one artificial intelligence model 903 may include the artificial intelligence model of the scene understanding module 303, the object recognition module 305, and/or the video editing module 311 described with reference to FIG. 3. Therefore, duplicate or similar descriptions may be omitted.

According to various embodiments, the electronic device 200 may obtain scene information and object information about the first video 901 through the at least one artificial intelligence model 903 (e.g., the scene understanding module 303, the object recognition module 305, and the video editing module 311 of FIG. 3.) According to an embodiment, the electronic device 200 may generate at least one content to be added to the first video 901 through the at least one AI model 903. In an embodiment, the at least one content may be generated based on scene information about the first video 901 and a plurality of images included in the first video 901. At this time, the at least one content may be generated based on scene information about a scene (e.g., first image) to which the at least one content is to be added.

According to various embodiments, the electronic device 200 may generate the second video 905 by adding the at least one content to the first video 901 through at least one artificial intelligence model 903. For example, the electronic device 200 may generate at least one content in relation to a first image in the first video 901 input through the at least one artificial intelligence model 903, and generate a second image obtained by adding the at least one content to the first image. In addition, the second video 905 may be generated by editing the input video based on the second image.

According to various embodiments, in obtaining the second video 905 by adding at least one content to the first video 901, the electronic device 200 may add at least one content based on a point set and a bounding box set for at least one object of the first video 901. For example, the electronic device 200 may obtain first scene information about the first image through the at least one artificial intelligence model 903, and obtain object information about at least one object by obtaining a point set and a bounding box set for at least one object included in the first image. In addition, the electronic device 200 may determine a position at which at least one content is to be added in relation to the first image based on the first scene information and the object information through the at least one artificial intelligence model 903, and generate a second image obtained by adding the at least one content to the first image based on the position. Therefore, the second video 905 obtained by editing the first video 901 based on the second image.

According to various embodiments, the electronic device 200 may transmit the user device 102 to output the second video 905. For example, the electronic device 200 may transmit the second video 905 (or information about a summary video) to the user device 102 through the communication device 230.

Referring to FIG. 10, an execution screen 1000 related to video editing output through the user device is illustrated.

According to various embodiments, the user device 102 may display an execution screen related to the video editing service based on a control signal obtained through the electronic device 200. The execution screen 1000 of the video editing service displayed through the user device may include a first region 1010, a second region 1020, and a third region 1030.

In this document, an icon may be replaced with a representation of a button, a menu, an object, etc. In addition, the visual objects illustrated in the first region 1010, the second region 1020, and/or the third region 1030 in FIG. 10 are exemplary, and other visual objects may be disposed or replaced with other icons or omitted.

According to various embodiments, the user device 102 may display an execution screen 1000 based on a control signal of the electronic device 200. According to various embodiments, the execution screen 1000 may include a first region 1010 in which the second video 905 is edited by using the at least one artificial intelligence model 903. The electronic device 200 may output a screen of the edited second video 905 to the first region 1010 through the user device 102.

According to various embodiments, the first region 1010 may display a plurality of images included in the edited second video 905. At this time, when at least one image among the plurality of images in the second video 905 edited in the first region 1010 is displayed, at least one content added in the first video 901 may be displayed through the second region 1020. According to various embodiments, the second region 1020 in which at least one content is displayed in the execution screen 1000 may include an region corresponding to a position at which the at least one content is to be displayed.

Referring to FIG. 10, the user device 102 may receive a control signal from the electronic device 200 and display image edited into a second image by adding at least one content among the plurality of images in the first video 901. For example, the electronic device 200 may understand that the first image in the first video 901 is an expression that one child plays through a scene understanding using at least one artificial intelligence model 903, and identify the position of the one child through object recognition using the at least one artificial intelligence model 903. In addition, the electronic device 200 may generate the content of the exclamation mark for the first image through the at least one artificial intelligence model 903, and determine the position at which the exclamation mark is to be displayed. Therefore, the electronic device 200 may generate the second image by adding the exclamation mark for the first image in the first video 901 to the second region 1020, and generate the second video 905 including the second image. At this time, the second image, which is the video edited by adding the content, may be displayed through the first region 1010.

According to various embodiments, the electronic device 200 may obtain a user input requesting correction for at least one content in the video through the first region 1010, the second region 1020, and/or the third region 1030 of the execution screen 1000 displayed through the user device 102. For example, the electronic device 200 may obtain a user input to correct the additional content (e.g., feeling table) displayed for the second image through the user device 102. According to various embodiments, the always user input may be obtained through a mouse click, a touch input, a sound input, a text input, a keyboard input, and the like.

According to various embodiments, the electronic device 200 may correct at least one content (e.g., feeling table) (position, shape size, type, and the like) based on the user input obtained through the user device 102, and output a third video generated based on the corrected at least one content.

According to various embodiments, the user device 102 may display information about a plurality of images and image groups included in the second video 905 through the third region 1030 based on the control signal of the electronic device 200. At this time, au image edited by adding at least one content among the plurality of the images may be displayed through a distinct visual object. (e.g., second image 1031)

According to the present disclosure, for convenience of explanation, an example of obtaining the second video 905 by adding at least one content to the first image in the first video 901 has been described, but it is not limited thereto and at least one content may be added to the at least one image in the first video 901.

According to various embodiments, the electronic device 200 may obtain the second video 905 (or information on the edited video) that is the edited video by executing the functions of the scene understanding module 303, the object recognition module 305, the video editing module 311 and/or the video generation module 315 described with reference to FIG. 3. Therefore, the operations of the electronic device 200 related to generating the edited video (e.g., the second video 905) described with reference to FIG. 3 may be applied identically or similarly.

Figure 11:
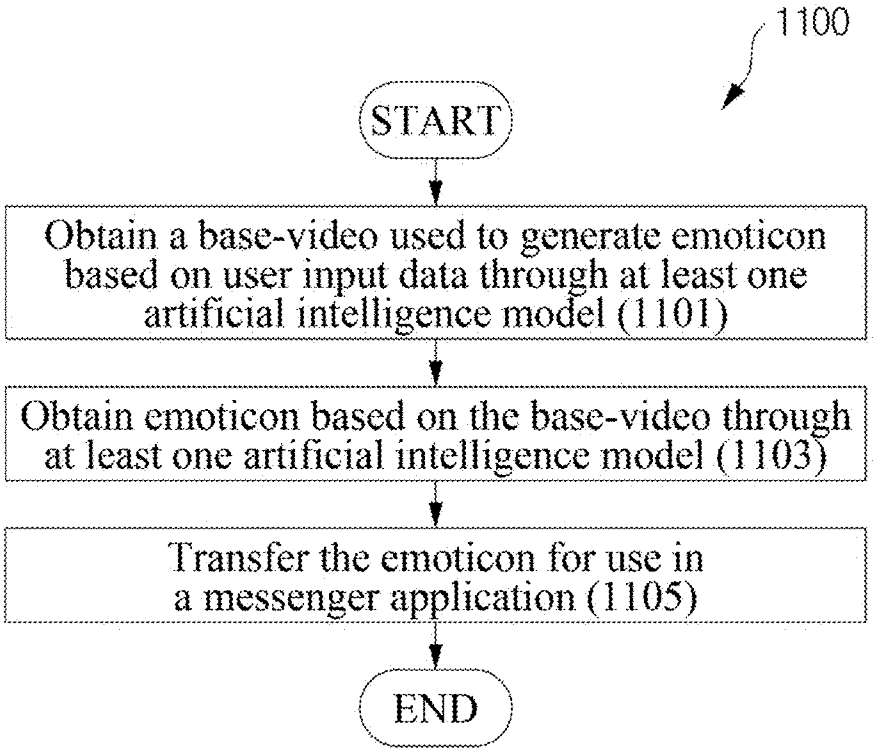
FIG. 11 is a flowchart illustrating an operation of obtaining an emoticon based on a video input by an electronic device according to various embodiments.

FIG. 11 is a flowchart 1100 illustrating an operation of obtaining emoticons based on a video input by an electronic device according to various embodiments.

Figure 12:
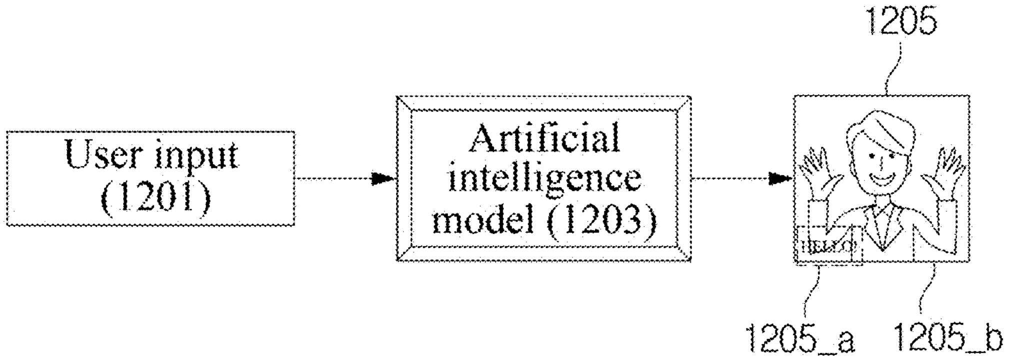
FIG. 12 is a diagram for explaining obtaining an emoticon using an artificial intelligence model according to various embodiments.

FIG. 12 is a diagram for explaining the obtaining of emoticons using artificial intelligence models according to various embodiments.

Figure 13:
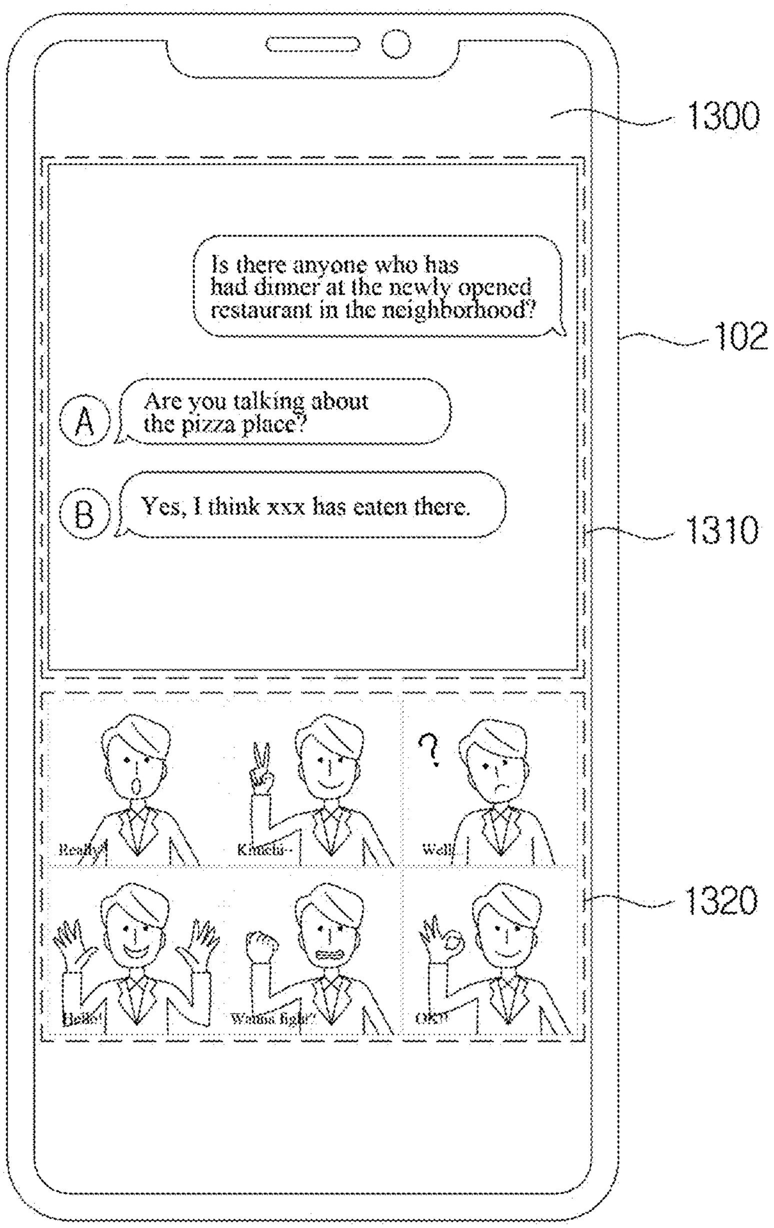
FIG. 13 illustrates an execution screen using an emoticon through a messenger application according to various embodiments.

FIG. 13 shows an execution screen 1300 using emoticons through messenger applications according to various embodiments.

Referring to FIG. 11, in operation 1101, the electronic device 200 may obtain a basic video used to generate an emoticon based on user input data through at least one artificial intelligence model.

Referring to FIG. 12, the electronic device 200 may obtain user input data 1201 based on a user request to generate an emoticon. According to various embodiments, the electronic device 200 may grasp the user's intention in the user input data 1201 using at least one AI model 1203, and output an emoticon 1205 corresponding to the user's intention. According to various embodiments, the at least one AI model 1203 (e.g., the scene understanding module 303, the object recognition module 305, the emoticon generation module 313, and/or the video generation module 315 of FIG. 3) may include a model trained to output the emoticon 1205 based on the user input data 1201.

According to various embodiments, in operation 1103, the electronic device 200 may obtain emoticons based on basic videos through at least one AI model 1203. For example, the electronic device 200 may obtain a basic video to be used to generate an emoticon through a user input. In an embodiment, the electronic device 200 may obtain scene information on the basic video input through at least one AI model 1203, and may obtain object information. In an embodiment, the electronic device 200 may generate the emoticon 1205 through the basic video, the scene information, and/or the object information input through the at least one AI model 1203.

According to various embodiments, in generating the emoticon 1205 using at least one AI model 1203, the electronic device 200 may include at least one image 1205_*b* included in the basic video in the emoticon 1205. In generating the emoticon 1205 using at least one AI model 1203, the electronic device 200 may include at least one content 1205_*a* in the emoticon 1205 based on the user input data 1201, scene information on the basic video, and object information on the basic video.

According to various embodiments, in operation 1105, the electronic device 200 may transmit the emoticon 1205 to be used in the messenger application. For example, as the messenger application stored in the user device 102 is executed, the electronic device 200 may transmit the emoticon 1205 to the user device 102 so that the user may use the emoticon.

Referring to FIG. 13, an execution screen 1300 of a messenger application executed through the user device 102 is illustrated. According to various embodiments, the user device 102 may use at least one emoticon 1320 obtained through the electronic device 200 in the messenger application. For example, the user device 102 may output conversation content 1310 by executing the messenger application in a partial region of the execution screen 1300, and may output at least one emoticon 1320 in a partial region of the execution screen 1300. Therefore, the user may use various emoticons generated through the electronic device 200 in the messenger application to display their intentions and emotions through various methods. In addition, the emoticon may be generated and used in the messenger application more easily and simply.

For the sake of convenience of explanation, the emoticon generated through the messenger application is described as being used, but it is not limited thereto, and the user device 102 may use at least one emoticon generated through the electronic device 200 in the execution of various applications.

According to various embodiments, the electronic device 200 may obtain the emoticon 1205 (or information about the emoticon) by executing the functions of the scene understanding module 303, the object recognition module 305, the emoticon generation module 313, and/or the video generation module 315 described with reference to FIG. 3. Therefore, the operations of the electronic device 200 related to generating the emoticon 1205 (or information about the emoticon) described with reference to FIG. 3 may be applied the same or similarly.

As described above, the electronic device (e.g., the electronic device 200 of FIG. 2) according to an embodiment includes a communication device (e.g., the communication device 230 of FIG. 2), a storage device (e.g., the electronic device 220 of FIG. 2) storing at least one artificial intelligence model trained to generate the emoticon based on the input video, and at least one processor (e.g., the processor 210 of FIG. 2), wherein the at least one processor is configured to obtain a first video including a plurality of images from a user device connected to the electronic device through the communication device, to obtain a first emoticon by inputting the first video to the at least one artificial intelligence model, and to transmit the first emoticon such that the user device outputs the first emoticon through the communication device, and the at least one artificial intelligence model may be trained to obtain scene information about the first video, to obtain a second video obtained by editing the first video based on the scene information, and to generate the first emoticon based on the second video.

According to an embodiment, the at least one processor may be configured to obtain image groups obtained by grouping a plurality of images included in the first video by reference units, and to obtain the second video obtained by summarized the first video based on the image groups.

According to an embodiment, the image groups may be obtained based on a scene change of the first video identified based on the scene information.

According to an embodiment, the at least one processor may be configured to generate at least one content to be added to the first video based on the scene information through the at least one artificial intelligence model, and to obtain the second video by adding the at least one content to the first video.

According to an embodiment, the at least one processor may be configured to obtain a point set and a bounding box set for at least one object included in the first video through the at least one artificial intelligence model, to identify the contour of the at least one object based on the point set and the bounding box set, and to obtain object information for the at least one object based on the scene information and the contour of the at least one object.

According to an embodiment, the at least one processor may be configured to determine a position at which the at least one content is to be added in relation to the first video based on the object information through the at least one artificial intelligence model, and to obtain the second video by adding the at least one content to the first video based on the position.

According to an embodiment, the at least one processor may be configured to obtain a user input to generate an emoticon, and to obtain a second emoticon through the at least one artificial intelligence model based on the user input and the first video, and the at least one artificial intelligence model may be trained to identify a user intent based on the user input, to obtain a third video by editing the first video based on the user intent and the scene information for the first video, and to generate the second emoticon based on the third video.

According to an embodiment, the at least one processor may be configured to generate at least one content to be added to the first video based on the user input and the scene information through the at least one artificial intelligence model, and to obtain the third video by adding the at least one content to the first video.

According to an embodiment, the at least one processor may be configured to obtain a user input to modify the first emoticon through the user device, to obtain a third emoticon generated based on the user input and the scene information through the at least one artificial intelligence model, and to transmit the third emoticon to output the third emoticon through the communication device.

According to an embodiment, the first emoticon may be used in a messenger application executed through the user device.

As described above, according to an embodiment, an operating method of an electronic device may include obtaining a first video including a plurality of images from a user device connected to the electronic device, obtaining scene information about the first video through at least one artificial intelligence model, obtaining a second video obtained by editing the first video based on the scene information through the at least one artificial intelligence model, obtaining a first emoticon based on the second video through the at least one artificial intelligence model, and transmitting the first emoticon so that the user device outputs the first emoticon.

According to an embodiment, the obtaining of the second video may include obtaining image groups grouped by grouping a plurality of images included in the first video by reference units, and obtaining the second video summarized the first video based on the image groups.

According to an embodiment, the obtaining of the second video may include generating at least one content to be added to the first video based on the scene information, and obtaining the second video obtained by adding the at least one content to the first video.

According to an embodiment, the operating method of the electronic device may further include obtaining a point set and a bounding box set for at least one object included in the first video, identifying a contour of the at least one object based on the point set and the bounding box set, and obtaining object information about the at least one object based on the scene information and the contour of the at least one object.

According to an embodiment, the obtaining of the second video may include determining a position at which the at least one content is to be added in relation to the first video based on the object information, and obtaining the second video obtained by adding the at least one content to the first video based on the position.

According to an embodiment, the operating method of the electronic device may further include obtaining a user input to generate an emoticon, identifying a user intent based on the user input through the at least one artificial intelligence model, obtaining a third video obtained by editing the first video based on the user intent and the scene information about the first video, and generating a second emoticon based on the third video.

As described above, an electronic device (e.g., the electronic device 200 of FIG. 2) according to an embodiment may include a display device, a storage device (e.g., the storage device 220 of FIG. 2) storing at least one artificial intelligence model trained to generate an emoticon based on an input video, and at least one processor (e.g., the processor 210 of FIG. 2), wherein the at least one processor may be trained to obtain a first video including a plurality of images, obtain a first emoticon by inputting the first video to the at least one artificial intelligence model, and output the first emoticon through the display device, wherein the at least one artificial intelligence model may be trained to obtain scene information about the first video, wherein the scene information is information related to scene understanding of the plurality of images, obtain a second video obtained by editing the first video based on the scene information, and generate the first emoticon based on the second video.

As described above, in a non-transitory computer-readable recording medium including a program for executing a method of controlling an electronic device that provides a video editing function, the method may include: obtaining a first video including a plurality of images; obtaining scene information about the first video through at least one artificial intelligence model; obtaining a second video obtained by editing the first video based on the scene information through the at least one artificial intelligence model, wherein the scene information is information related to scene understanding of the plurality of images; obtaining a first emoticon based on the second video through the at least one artificial intelligence model; and transmitting the first emoticon to output the first emoticon.

In this disclosure, each of the phrases such as "a" or "b" at least one of "a" and "b", at least one of "a" or "b", "a", "b", or "c", at least one of "a", "b", and "c", and at least one of "a", "b", or "c" may include any one of the items listed together in the corresponding phrase, or any combination thereof.

Terms such as "first," "second," or "first," or "second," may be used to simply distinguish the corresponding component from other corresponding components, and the corresponding components are not limited in other aspects (e.g., importance or order).

The term "module" used in various embodiments of the present disclosure may include a unit implemented in hardware, software, or firmware. For example, the term "module" may be used interchangeably with logic, logic block, components, or circuits. The module may be an integrated component or a minimum unit of the component or a part thereof that performs one or more functions.

Various embodiments of the present disclosure may be implemented as software (e.g., a program) including one or more instructions stored in the storage device 220 (e.g., an internal memory or an external memory) that can be read by the device (e.g., the electronic device 200). The storage device 220 may be expressed as a storage medium.

According to an embodiment, a method according to various embodiments of the present disclosure may be included in a computer program product. The computer program product may be traded between a seller and a buyer as a product. The computer program product may be distributed in the form of a readable storage medium (e.g., compact disc read only memory (CD-ROM)) or distributed (e.g., downloaded or uploaded) online through an application store or between two user devices.

According to various embodiments, each component (e.g., module or program) of the above-described components may include a single entity or a plurality of entities, and some of the plurality of entities may be separately arranged in other components. According to various embodiments, one or more components or operations among the above-described corresponding components may be omitted, or one or more other components or operations may be added. Additionally or alternatively, a plurality of components (e.g., modules or programs) may be integrated into one component. In this case, the integrated component may perform one or more functions of each component of the plurality of components in the same or similar manner as that performed by the corresponding component among the plurality of components before the integration.

According to various embodiments, operations performed by a module, a program, or another component may be executed sequentially, in parallel, repeatedly, or heuristically, one or more of the operations may be executed in a different order, omitted, or one or more other operations may be added.

What is claimed is:

1. An electronic device comprising:

a communication device;

a storage device storing at least one artificial intelligence model trained to generate an emoticon based on an input video; and at least one processor, wherein the at least one processor is configured to:

obtain a first video including a plurality of images from a user device connected to the electronic device through the communication device, obtain a first emoticon by inputting at least the first video to the at least one artificial intelligence model, and transmit the first emoticon to output the first emoticon by the user device, through the communication device, wherein the at least one artificial intelligence model is trained to:

obtain scene information about the first video, wherein the scene information is information related to scene understanding of the plurality of images, generate at least one visual content corresponding to the scene information, obtain a second video edited from the first video by adding, based on the scene information, the at least one visual content to a region in the first video, and generate the first emoticon based on the second video.

2. The electronic device of claim 1, wherein the at least one processor is configured to:

obtain image groups by grouping the plurality of images included in the first video by reference units, generate a summarized video by summarizing the first video based on the image groups, obtain the second video by adding the at least one visual content to a region within the summarized video based on the scene information thereby editing the first video, and obtain the first emoticon based on the second video.

3. The electronic device of claim 2, wherein the image groups are obtained based on a scene change of the first video identified based on the scene information.

4. The electronic device of claim 1, wherein the at least one processor is configured to, through the at least one artificial intelligence model:

obtain a point set and a bounding box set for at least one object included in the first video, identify a contour of the at least one object based on the point set and the bounding box set, and obtain object information about the at least one object based on the scene information and the contour of the at least one object.

5. The electronic device of claim 4, wherein the at least one processor is configured to, through the at least one artificial intelligence model:

determine a position at which the at least one visual content is to be added in relation to the first video based on the object information, and obtain the second video by adding the at least one visual content to the first video based on the position.

6. The electronic device of claim 1, wherein the at least one processor is configured to:

obtain a user input to generate an emoticon, and obtain a second emoticon based on the user input and the first video, wherein the at least one artificial intelligence model is trained to:

identify a user intention based on the user input, obtain a third video by editing the first video based on the user intention and the scene information about the first video, and generate the second emoticon based on the third video.

7. The electronic device of claim 6, wherein the at least one processor is configured to, through the at least one artificial intelligence model:

generate at least one further visual content to be added to the first video based on the user input and the scene information; and obtain the third video by adding the at least one further visual content to the first video.

8. The electronic device of claim 1, wherein the at least one processor is configured to:

obtain a user input to modify the first emoticon through the user device;

obtain a third emoticon generated based on the user input and the scene information through the at least one artificial intelligence model; and transmit the third emoticon to the user device, through the communication device, to output the third emoticon.

9. A method of operating an electronic device, the method comprising:

obtaining a first video including a plurality of images from a user device connected to the electronic device;

obtaining a first emoticon by inputting at least the first video into at least one artificial intelligence model; and transmitting the first emoticon so that the user device outputs the first emoticon, wherein the obtaining of the first emoticon comprises, through the at least one artificial intelligence model:

obtaining scene information about the first video, wherein the scene information is information related to scene understanding of the plurality of images;

generating at least one visual content corresponding to the scene information;

obtaining a second video by adding the at least one visual content to a region within the first video based on the scene information, thereby editing the first video; and obtaining the first emoticon based on the second video.

10. The method according to claim 9, wherein obtaining the second video comprises:

obtaining image groups by grouping the plurality of images included in the first video by reference units; generating a summarized video by summarizing the first video based on the image groups; and obtaining the second video by adding the at least one visual content to a region within the summarized video based on the scene information, thereby editing the first video.

11. The method according to claim 9, further including:

obtaining a point set and a bounding box set for at least one object included in the first video;

identifying a contour of the at least one object based on the point set and the bounding box set; and obtaining object information for the at least one object based on the scene information and the contour of the at least one object.

12. The method according to claim 11, wherein obtaining the second video includes:

determining a position at which the at least one visual content is to be added in relation to the first video based on the object information; and obtaining the second video by adding the at least one visual content to the first video based on the position.

13. A non-transitory computer-readable recording medium comprising a program that executes a control method of an electronic device that provides a video editing function, the control method of the electronic device comprising:

obtaining a first video including a plurality of images;

obtaining scene information about the first video through at least one artificial intelligence model, wherein the scene information is information related to scene understanding of the plurality of images;

generating at least one visual content corresponding to the scene information through the at least one artificial intelligence model;

obtaining a second video by adding the at least one visual content to a region within the first video based on the scene information through the at least one artificial intelligence model, thereby editing the first video;

obtaining a first emoticon based on the second video through the at least one artificial intelligence model; and transmitting the first emoticon to output the first emoticon.

* * * * *